United States Patent [19]

Michael

[11] Patent Number: 4,999,325

[45] Date of Patent: Mar. 12, 1991

[54] REBONDED FUSED BRICK

[76] Inventor: David J. Michael, 2615 Poinsettia Dr., White Oak, Pa. 15131

[21] Appl. No.: 264,117

[22] Filed: Oct. 28, 1988

[51] Int. Cl.$^5$ .................... C04B 35/04; C04B 35/12
[52] U.S. Cl. .................................. 501/115; 501/110; 501/114
[58] Field of Search ................ 501/114, 115, 110

[56] References Cited

U.S. PATENT DOCUMENTS

| | | | |
|---|---|---|---|
| 2,671,732 | 3/1954 | Birch et al. | 501/114 |
| 3,262,797 | 7/1966 | Davies | 501/115 |
| 3,578,474 | 5/1971 | Whittemore | 501/115 |
| 3,589,919 | 6/1971 | Nelsan et al. | 501/115 |
| 3,726,699 | 4/1973 | Nelson et al. | 501/115 |

*Primary Examiner*—Karl Group
*Attorney, Agent, or Firm*—Sigalos, Levine & Montgomery

[57] ABSTRACT

A rebonded, fused brick resulting from burning a mix consisting essentially of a fused magnesite chrome grain, a fused chrome-magnesite grain or mixtures thereof, and a chrome ore having a $Cr_2O_3/(Al_2O_3+Fe_2O_3)$ ratio of at least about 1.15, a maximum silica content of about 3.85, and an $Fe_2O_3$ content of less than about 25% by weight.

10 Claims, No Drawings

REBONDED FUSED BRICK

BACKGROUND OF THE INVENTION

The present invention relates to brick for use in the construction of furnace linings for metallurgical applications.

At the present time, magnesite-chrome and chrome-magnesite brick are widely used for this purpose and are made in a number of ways. Thus, deadburned magnesite can be simply mixed with chrome ore and pressed into brick shapes that are then fired to effect ceramic bonding. These are generally fired at a high enough temperature to obtain a substantial amount of bonding between the deadburned magnesite and the chrome ore and thus such brick have been termed "direct bonded brick" to distinguish them from brick burned at lower temperatures.

In brick burned at lower temperatures, the accessory silicate minerals from the deadburned magnesite and chrome ore form the primary bond and thus this type of brick is often referred to as "silicate bonded brick" and do not generally have sufficient enough corrosion resistance to be used in applications where there will be particularly severe environments. It is also known, however, that while direct bonded brick outperform the silicate bonded brick in the severe service environments, even the direct bonded brick are subject to slag attack because of their relatively high porosity. Efforts to lower the porosity of these bricks has proven to be difficult because the brick expand in burning. One effort to eliminate the porosity problem is to make the brick-making grain from a fine magesite and chrome ore. This type of grain is often called "coburned" grain. It can be made, for example, by briquetting fine magnesite and fine chrome ore and firing the briquettes to effect densification and ceramic bonding. Alternatively, a mixture of fine magnesite and fine chrome is fed to a rotary kiln where the rotating action of the kiln produces the desired agglomerates. Other methods of producing coburned grain are also known and utilized. This coburned grain is then crushed, graded, and ball milled into appropriate brick making fractions and used to make brick in a conventional manner. On firing, such brick typically shrink rather than expand and the final brick have a lower porosity than direct bonded magnesite-chrome brick.

Another manner of making a low porosity brick is to make fused magnesite chrome or fused chrome magnesite grain. The fused grain is made by charging deadburned magnesite and chrome ore into an electric arc furnace where the mixture is melted. The melt is then allowed to cool to room temperature and the solidified material is crushed and graded resulting in extremely dense, low porosity grain. The fused grain is used to make the densest, lowest porosity magnesite chrome and chrome magnesite brick available. These brick are often referred to as "rebonded fused magnesite-chrome brick" or "rebonded fused chrome-magnesite brick", depending on the relative proportions of the minerals. These rebonded brick are characterized by excellent resistance to chemical attack as from slag. However, they have poor thermal shock resistance.

SUMMARY OF THE INVENTION

The present invention provides rebonded fused magnesite-chrome and rebonded fused chrome-magnesite brick having really improved thermal shock properties as well as improved slag resistance.

Briefly stated, the present invention comprises a rebonded fused brick resulting from burning a mix consisting essentially of a fused magnesite-chrome grain, a fused chrome-magnesite grain or mixtures thereof, and a chrome ore having a $Cr_2O_3/(Al_2O_3+Fe_2O_3)$ ratio of at least 1.15, a maximum silica content of about 3.85% by weight and a $Fe_2O_3$ content of less than about 25% by weight. The invention also comprises the mix for forming the brick.

DETAILED DESCRIPTION

The critical aspect of the instant invention is the utilization of a chrome ore of controlled chemistry in making the rebonded brick.

More particularly, the chrome ore must contain a high proportion of chromic oxide relative to iron oxide and alumina.

The ratio of $Cr_2O_3/(Al_2O_3+Fe_2O_3)$ in the chrome ores of the present invention must be at least about 1.15. It is also important that the chrome ore used in the instant invention have a low silica content, preferably a maximum silica content of no more than about 3.85% based on the total weight of the chrome ore. More suitably, it is also desired that the chrome ore not contain more than about 25% by weight of the iron oxide. Typical chrome ores suitable for use in the instant invention are as follows:

| Chemical Analysis | Chrome Ore A | Chrome Ore B |
|---|---|---|
| (Calcined Basis) | | |
| Silica ($SiO_2$) | 2.19% | 1.03% |
| Alumina ($Al_2O_3$) | 10.40 | 15.6 |
| Titania ($TiO_2$) | 0.14 | 0.36 |
| Iron Oxide ($Fe_2O_3$) | 15.50 | 22.9 |
| Chromic Oxide ($Cr_2O_3$) | 55.90 | 48.3 |
| Lime (CaO) | 0.09 | 0.13 |
| Magnesia (MgO) | 15.4 | 11.3 |
| Total Analyzed | 99.62% | 99.62% |
| $Cr_2O_3/(Al_2O_3 + Fe_2O_3)$ Ratio: | 2.16 | 1.25 |

With respect to the fused magnesite-chrome grain or fused chrome-magnesite grain, it is preferred to use a fused manesite-chrome grain containing at least about 60% MgO, although the MgO content of the fused grain can range from about 40 to 75% by weight.

The amount of the fused grain in the mix for each 100% by weight thereof, can vary from about 55 to 85% by weight; preferably 70% by weight, and the chrome ore can correspondingly vary from 45 to 15% by weight; preferably 30% by weight.

Other components that are conventionally used in brick making such as oils for use as mold release agents and lignosulfonates or other temporary binders for the brick while it is in the green state are added in their usual proportions and for their usual purpose.

The method of making the brick is that conventionally used. Namely, the fused grain and the ore are admixed together with the usual additives such as a mold releasing agent and the like and the brick then pressed and fired using the conventional conditions used to make such brick presently.

The invention will be further described in connection with the following examples which are set forth for purposes of illustration only.

EXAMPLES 1 and 2

A conventional rebonded fused brick presently being made and one in accordance with the instant invention were prepared. More particularly, the same formulation was used for both but in accord with the instant invention there was added to that mix 30% by weight of chrome ore having a chromic oxide to alumina plus iron oxide ratio of 2.16, a silica content of 2.19%, and an iron oxide content of 15.5%. The brick were then prepared under the same conditions and burned at 3080° F. with a 10 hour hold. The mixed compositions are set forth in Table I that follows:

TABLE I

| Example No. | 1<br>Present<br>Invention | 2<br>Prior<br>Art |
|---|---|---|
| Mix: | | |
| Fused Magnesite-Chrome Grain | 70% | 100% |
| Chrome Ore | 30% | — |
| Plus Additions: | | |
| Lignosulfonate Binder | 3.2 | 3.2 |
| Oil | 0.3 | 0.3 |

The resultant brick were then tested as to slag resistance and thermal shock properties and the test results are set forth in Table II that follows:

TABLE II

| Example No. | 1 | 2 |
|---|---|---|
| Density at the Press, pcf (Av 1); | 221 | 212 |
| Dimensions, inches (AV 10) | | |
| Length | 9.00 | 8.98 |
| Width | 4.50 | 4.47 |
| Thickness | 2.48 | 2.46 |
| Bulk Density, pcf (Av 10) | 218 | 212 |
| Data from Porosity (Av 3) | | |
| Bulk Density, pcf | 216 | 210 |
| Apparent Porosity, % | 12.3 | 12.3 |
| Apparent Specific Gravity | 3.94 | 3.84 |
| Modulus of Rupture, psi (Av 3) | | |
| At 2700° F. | 910 | 730 |
| At 2900° F. | 476 | 477 |
| Loss of Strength Test (1 × 1 × 6" bars) (Av 5) | 1180 | 2420 |
| Room Temperature MOR Before Cycling | | |
| Room Temperature MOR After 5 Cycles Between Room Temperature and 1200° C. | 388 | 321 |
| Strength Loss, psi | 792 | 2099 |
| Strength Loss, % | 67.1 | 86.7 |
| Degasser Drip Slag Test at 2950° F. Using 2000 Grams of Slag (Oxidizing Conditions) | 11 | 17 |
| Volume Eroded, cm$^3$ | | |

It will be seen that the mix of the instant invention containing the specific chrome ore lost only 67.1% of its strength in the Loss of Strength Test after cycling while the prior art mix lost 86.7% of its strength. This indicates a much better and greatly improved spalling resistance. In addition, in the Degasser Drip Slag Test 11 cm$^3$ eroded as opposed to 17 CM$^3$ for the prior art brick.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A rebonded, fused brick resulting from burning a mix consisting essentially of a fused magnesite-chrome grain, a fused chrome-magnesite grain, or mixtures thereof, and a chrome ore having a $Cr_2O_3/(Al_2O_3+Fe_2O_3)$ weight ratio of at least about 1.15, a maximum silica content of about 3.85% by weight and an $Fe_2O_3$ content of less than about 25% by weight.

2. The rebonded, fused brick of claim 1 wherein for each 100% by weight of brick there is from about 55 to 85% by weight of said fused grain and, correspondingly, from about 45 to 15% by weight of said ore.

3. The rebonded, fused brick of claim 2 wherein the fused grain is a fused magnesite-chrome grain.

4. The rebonded, fused brick of claim 2 wherein the fused grain is a fused chrome-magnesite grain.

5. The rebonded, fused brick of any one of claims 1, 2, 3, or 4 wherein there is about 70% by weight of the fused grain and about 30% by weight of the chrome ore.

6. A mix for making a rebonded, fused brick consisting essentially of a fused magnesite-chrome grain, a fused chrome-magnesite grain, or mixtures thereof, and a chrome ore having a $Cr_2O_3/(Al_2O_3Fe_2O_3)$ weight ratio of at least about 1.15 a maximum silica content of about 3.85% by weight, and an $Fe_2O_3$ content of less than about 25% by weight.

7. The mix of claim 6 wherein for each 100% by weight of brick there is from about 55 to 85% by weight of said fused grain and, correspondingly, from about 45 to 15% by weight of said ore.

8. The mix of claim 7 wherein the fused grain is a fused magnesite chrome grain.

9. The mix of claim 7 wherein the fused grain is a fused chrome-magnesite grain.

10. The mix of any one of claims 6, 7, 8, or 9 wherein there is about 70% by weight of the fused grain and about 30% by weight of the chrome ore.

* * * * *